UNITED STATES PATENT OFFICE.

PAUL BÖTTIGER, OF LODZ, RUSSIA, ASSIGNOR TO THE ACTIENGESELLSCHAFT FÜR ANILIN FABRIKATION, OF BERLIN, GERMANY.

MANUFACTURE OF NEW RED DYE-STUFFS OR COLORING-MATTERS.

SPECIFICATION forming part of Letters Patent No. 365,666, dated June 28, 1887.

Application filed November 22, 1884. Serial No. 148,595. (No specimens.) Patented in Germany February 27, 1884, No. 28,753; in France March 4, 1884, No. 166,722, and in England March 5, 1884, No. 4,415.

*To all whom it may concern:*

Be it known that I, PAUL BÖTTIGER, a subject of the King of Saxony, Germany, residing at the city of Lodz, in the Empire of Russia, have invented certain new and useful Improvements in the Manufacture of Red Dye-Stuffs, (for which Letters Patent have heretofore been granted to me by the following governments: Germany, No. 28,753, dated February 27, 1884; France, No. 166,722, dated March 4, 1884, and England, (provisional protection,) No. 4,415, dated March 5, 1884,) of which the following is a specification.

This invention relates to the manufacture of new red dye-stuffs by combining tetrazo-diphenyl with naphthylamines or their sulpho-acids, which is effected by bringing into contact aqueous solutions of tetrazo-diphenyl salts with aqueous solutions of alpha or beta naphthylamines, or with aqueous solutions of salts of the various sulpho-acids of alpha or beta naphthylamines. Instead of aqueous solutions of naphthylamine salts, there may be used alcoholic solutions of alpha or beta naphthylamine, or alpha or beta naphthylamine or their salts finely divided in water. The result of the combination of tetrazo-diphenyl with both naphthylamines are dye-stuffs which are insoluble in water, but soluble in alcohol, and which form their respective mono and disulpho acids by treatment with concentrated sulphuric acid, anhydrous sulphuric acid, fuming sulphuric acid, or monochlorhydrine. The alkali salts of the thus-formed mono and disulpho acids are yellowish-red or bluish-red dye-stuffs which are soluble in water.

When alpha-naphthylamine is used, red dye-stuffs are formed, while beta-naphthylamine, in combination with tetrazo-diphenyl, yields yellowish-red dye-stuffs. When tetrazo-diphenyl is combined with the sulpho-acids of alpha or beta naphthylamine, substances are formed that dissolve in water which is free of acid, and whose alkali salts form also yellowish-red to bluish-red dye-stuffs. The formation of these substances can be effected by either pouring an aqueous solution of a tetrazo-diphenyl salt in an alkaline aqueous solution of a salt of the alpha or beta naphthylamine sulpho-acids, while keeping the latter solution constantly alkaline, in which case directly alkaline solutions of the new dye-stuffs are obtained, or by adding an aqueous solution of a tetrazo-diphenyl salt to an alcoholic solution of naphthylamine sulpho-acid, or to naphthylamine sulpho-acid finely divided in water. This reaction— that is to say, the formation of the new dye-stuff—is, however, going on in the easiest manner if a solution of a tetrazo-diphenyl salt of one of the various sulpho-acids of alpha or beta naphthylamine is used, to which solution the required amount of sodium acetate has been added, so as to prevent the presence of free strong mineral acids—such as sulphuric or hydrochloric acids—after the solutions have been mixed, while some free acetic acid is left in the solution; but even then the formation of the new dye-stuffs does not take place instantly, but gradually, and requires several hours before the reaction is completed.

The new dye-stuffs are formed by combining one molecule of tetrazo-diphenyl with two molecules of alpha or beta naphthylamine or alpha or beta naphthylamine sulpho-acid, according to the following equation:

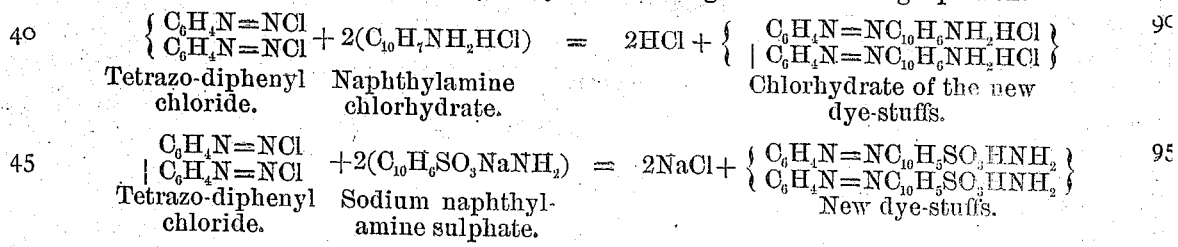

The salts of tetrazo-diphenyl are formed, as | *Example 1.*—25.7 kilos of hydrochlorate of salt of benzidine, are finely divided in five hundred liters of water containing thirty kilos of hydrochloric acid of 20° Baumé. To this is added under continuous stirring, and in small portions, a solution of 13.8 kilos of sodium nitrite of one hundred per cent. in one hundred and fifty liters of water.

The salts of benzidine to be diazotized should not be used in a dry state, but in the shape of a moist paste, as the reaction takes place slowly and imperfectly with dry benzidine salts. The benzidine salt dissolves and forms a solution of tetrazo-diphenyl chloride. This solution is poured under continuous stirring into a solution of 36.5 kilos of hydrochlorate of alpha-naphthylamine in two thousand liters of water. A precipitate is formed at once, which, after settling for several hours, is decanted from the mother-liquor. It is then washed and dried. In order to transform the thus-formed dye-stuff, which is soluble in alcohol, into its monosulpho-acid, twenty-five kilos of the dye-stuff are finely ground and sifted, and then slowly mixed, while exposed to cooling, with seventy-five kilos of fuming sulphuric acid containing twenty per cent. of anhydrous acid. The mixture is then raised to a temperature of 30° centigrade until a sample taken from the molten mass dissolves entirely in water containing some ammonia. When this point of solubility is reached, the mass is mixed under continuous stirring with about one thousand liters of water. The sulpho-acid formed thereby settles as a precipitate. It is separated from the mother-liquor by decanting and then transformed into a sodium or ammonium salt in the well-known manner. In order to produce a disulpho-acid of the substance formed by the combination of tetrazo-diphenyl with alpha-naphthylamine, twenty-five kilos of the same are mixed with seventy-five kilos of fuming sulphuric acid containing twenty per cent. anhydrous acid, while the mixture is kept cool. Seventy-five kilos of fuming sulphuric acid containing twenty per cent. of anhydrous acid are then added and the mixture heated and kept at a temperature of 50° to 60° centigrade for about an hour. The molten mass is poured into about three thousand liters of water and then boiled; next saturated with milk of lime and filtered. The calcium salt of the disulpho-acid contained in the filtered liquid is decomposed by either sodium or ammonium carbonate. Thus solutions of the ammonium or sodium salts of the disulpho-acid of the alpha-amido-naphthaline tetrazo-diphenyl are obtained, which, after being mechanically separated from the calcium carbonate, are evaporated to dryness, or the salts are obtained therefrom in the well-known manner by evaporation and treatment with common salt.

*Example 2.*—25.7 kilos of chlorhydrate of benzidine, or 28.2 kilos sulphate of benzidine, or an equivalent amount of some other salt of benzidine, are diazotized in the same way as described in the first example. The thus-resulting solution of tetrazo-diphenyl chloride is slowly poured under continuous stirring into one thousand liters of water containing fifty-five kilos of sodium naphthionate and twelve kilos of sodium acetate. After having settled for about twelve hours the thus-formed paste of dye-stuffs is mechanically separated from the mother-liquor and subsequently transformed in the usual manner into a sodium or ammonium salt and afterward dried. The thus-produced new dye-stuff imparts a permanent red color to wool and cotton, the latter taking it without the use of any mordants.

Having thus described my invention, I claim as new and desire to secure by Letters Patent—

The process herein described of making new red dye-stuffs, which consists, first, in combining the salts of tetrazo diphenyl with alpha or beta naphthylamines, and, secondly, in treating the thus-formed dye-stuffs with concentrated sulphuric acid, anhydrous sulphuric acid, or monochlorhydrine, whereby the mono or disulpho acids of said dye-stuffs or the salts of said acids are obtained, substantially as set forth.

In testimony whereof I have signed my name to this specification in the presence of two subscribing witnesses.

PAUL BÖTTIGER.

Witnesses:
 THEODOR ZIEM,
 T. LEIDLER.